United States Patent [19]

Ishikawa et al.

[11] Patent Number: 4,717,629

[45] Date of Patent: Jan. 5, 1988

[54] COMPACT OF HYDROGEN ADSORPTION ALLOY

[75] Inventors: Hiroshi Ishikawa; Keisuke Oguro; Hiroshi Suzuki; Akihiko Kato; Teruya Okada; Shizuo Sakamoto; Iwao Nishimura, all of Osaka; Keizo Sakaguchi, Hyogo, all of Japan

[73] Assignees: Agency of Industrial Science & Technology; Kurimoto Ltd., both of Japan

[21] Appl. No.: 9,007

[22] Filed: Jan. 28, 1987

Related U.S. Application Data

[63] Continuation of Ser. No. 758,015, Jul. 24, 1985, abandoned.

[30] Foreign Application Priority Data

Nov. 30, 1984 [JP] Japan .................................. 59-254415

[51] Int. Cl.$^4$ ................................. C01B 6/00
[52] U.S. Cl. ..................... 428/566; 428/570; 428/613; 423/644; 420/900
[58] Field of Search ....................... 420/900, 590, 570; 428/566, 613, 567, 568; 423/644, 648 R

[56] References Cited

U.S. PATENT DOCUMENTS

| | | | |
|---|---|---|---|
| 4,292,265 | 9/1981 | Ron et al. | 264/82 |
| 4,310,601 | 1/1982 | Bernauer et al. | 428/566 |
| 4,451,445 | 5/1984 | Cheng et al. | 423/645 |
| 4,507,263 | 3/1985 | Ron | 419/48 |

FOREIGN PATENT DOCUMENTS

| | | | |
|---|---|---|---|
| 3144913 | 5/1983 | Fed. Rep. of Germany | 420/900 |
| 3342264 | 12/1984 | Fed. Rep. of Germany | 420/900 |
| 1032 | 1/1983 | Japan | 420/900 |

*Primary Examiner*—Christopher W. Brody
*Attorney, Agent, or Firm*—Jones, Tullar & Cooper

[57] ABSTRACT

This invention discloses a compact of hydrogen adsorption alloy principally composed of a metal hydride in which all surfaces of fine particles of hydrogen adsorption alloy are completely coated with a dissimilar metal by plating, without effecting reactivity and a porous material of high thermal conductivity is infiltrated with the fine particles of alloy to be formed into a compact by compression molding.

By this construction, it is possible to improve decline in the thermal conductivity or dropping of the fine particles out of cells of the porous material caused by micronization as a result of repeated uses of the hydrogen adsorption alloy are avoided.

2 Claims, No Drawings

COMPACT OF HYDROGEN ADSORPTION ALLOY

CROSS REFERENCE RELATED TO APPLICATION

This application is a continuation of application, Ser. No. 758,015, filed on July 24, 1985, and now abandoned.

BACKGROUND OF THE INVENTION

1. Field of the Invention

This invention relates to a compact of hydrogen adsorption alloy principally composed of metal hydride and, more particularly, to a compact the hydrogen adsorption capacity of which is hard to to lower or decline in spite of repeated uses.

2. Prior Art

Heretofore, several arts have been developed with respect to the hydrogen adsorption alloy, wherein a hydrogen is adsorbed in a certain metal alloy to be stored therein and transferred therefrom in the form of a metal hydride. These arts have been further applied to such practical uses as the purification of hydrogen, the design of heat pumps, the design of air-conditioning systems, etc.

In such cases, since an exothermic reaction or an endothermic reaction necessarily takes place when the metal hydride adsorbs or discharges the hydrogen, the delivery of hydrogen does not take place without rapid delivery of heat between the metal hydride and the outside.

However, a thermal conductivity of the hydrogen adsorption alloy itself is actually low and is further lowered by decay and micronization of the alloy along with repeated and continuous adsorptions and discharges of the hydrogen, bringing about the lowering or decline of the hydrogen adsorption capacity.

In order to overcome this problem, to date several attempts have been proposed. For example, according to the "Method of Improving a Heat Conductivity of Metal Hydride" disclosed in Japanese laid open Patent Publication (unexamined) No. 56-120502, a metal hydride is divided finely into particles to fill in cells of sufficiently heat-conductive porous material which are communicated with the outside thereof, and the heat is supplied or exhausted by way of this material. It is reported that by the foregoing design, the heat conductivity of the metal hydride is improved.

Further, according to the "Compound Compact of Hydrogen Adsorption Alloy and Manufacturing Method thereof" disclosed in Japanese laid open Patent Publication (unexamined) No. 59-162102, fine particles of hydrogen adsorption alloy are mixed with a powdered or fine fibrous heat conductive metallic material, and a process of sintering is applied to a mixed material within the temperature range higher than the melting point thereof. A compact is formed thereby in such a manner that the hydrogen adsorption alloy is included in a two or three dimensional network (or meshed) structure of the heat conductive metallic material. It is reported that a measured value of an effective thermal conductivity (W/m.K) of this compact amounts to 30 to 100 times as many as the powdered hydrogen adsorption alloy layer.

It is further reported according to Thyssen in German Pat. No. DE 3144913, that partially coating surfaces of powder particles with a metal softner before these powder particles are to be molded does not appreciably promote bonding of the powder particles as well as compactibility by compression molding. According to Thyssen, the coating should be applied partially to the powder particles so as not to effect a reactivity with hydrogen gas.

A serious problem which is common in all of the above-mentioned three known arts exists in that the powdered hydrogen adsorption alloy material itself is not improved at all. In other words, at the earlier stage of use, both of the known arts assure excellent heat conductivity of the compact as a whole by the action of the heat conductive metallic material enabling rapid adsorption and discharge of the hydrogen, but along with repeated and continuous uses, the surface of the hydride becomes contaminated (or corroded) by impurities in the atmosphere or oxidized by the oxygen in the air to the extent of forming an oxide film, thereby considerably declining the adsorption function. Moreover, as a result of volume expansions and contractions repeately taking place for every hydrogeneration and dehydrogeneration, the compact decays and is micronized, finally getting over the constraining force of the metallic matrix and the micronized particles dropping out thereof.

Thus, a first problem to be solved is that the adsorption capacity declines is a short period caused by a decline of heat conductivity and filling rate along with continuous use.

Furthermore, in the case of the foregoing first prior art, since the fine particles of metal hydride of 50 meshes or so are simply infiltrated into the porous cell by vibration and no other particular process is applied thereto, the fine alloy particles are easily micronized by repeated use and drop out of the cell, eventually bringing about the lowering of the adsorption capacity.

In the case of the foregoing second prior art, since it is required that the sintering process is applied to the heat conductive metallic material within a higher temperature range than the melting point thereof, a mixture of the powdered hydrogen adsorption alloy (MmNi$_{4.5}$Al$_{0.5}$) with the powdered copper formed by compression molding is to be treated with heat at 1100° C. for 4 hours according to one mode of this prior art. In applying such a heat treatment at such a high temperature, it is essentially required to use a heat-treat furnace which is controllable with high accuracy, and the level of control and operation thereof must be also kept high.

According to Thyssen, reactivity is not affected by partial coating. However, neither thermal conductivity nor compactability by compression molding are promoted. As a result, with repetition of reactions, there is the possibility that the molded compact is micronized or deteriorated in a rather short period of time.

Moreover, in both of the foregoing prior arts, when it is necessary for a compact to be drilled as an integral part of an apparatus, since the constraining force of the metallic material used as a base material (or a cell) is small, a sufficient workability is not secured and even when continuing the drilling work, the finish thereof is rough and poor.

SUMMARY OF THE INVENTION

It is therefore an object of this invention to provide a compact of hydrogen adsorption alloy of which the hydrogen adsorption capacity is hard to lower or decline in spite of repeated and continuous uses, and which is quite easy to be machined after the molding thereof, solving the above-discussed problems thereby.

In order to accomplish the foregoing object, the compact of hydrogen adsorption alloy in accordance with this invention is obtained by a process of coating all surfaces of fine particles of hydrogen alloy with dissimilar metal by plating, and a process of filling these coated fine particles in a sufficiently heat-conductive porous material to be formed into a compact by compression molding.

In this connection, the fine particle materials to be used preferably as the hydrogen adsorption alloy are lanthanum-nickel, misch metal-nickel-aluminum, iron-titanium, titanium-manganese, calcium-nickel, magnesium-copper, magnesium-nickel. Preferable dissimilar metals are copper, nickel, etc. Any of such coating method as electroplating, vacuum evaporation or immersion electroless plating is available, but a reduction electroless plating is particularly preferred.

As for the heat-conductive porous materials, it is possible to employ a foam metal, compressed metallic fiber bundle, compressed metallic powder of rough crystal, but the foam metal is particularly preferred.

So far as appropriately satisfying individual requirements, the surfaces of fine particles of hydrogen adsorption alloy are satisfactorily coated with the dissimilar metal, i.e., an encapsulation takes place. The film formed by this coating is uniform and excellent in adhesion, and inhibits the impurities contained in the atmosphere getting in except hydrogen, in spite of being provided with pores adapted to the diameters of the hydrogen molecules in order to keep the hydrogen adsorbing and discharging function. Besides, as a result of corrosion resistance of the dissimilar metal, there is no such disadvantage as formation of an oxide film on the surfaces of the fine particles. As a further function of this invention, in case of the repeated adsorptions and discharges of hydrogen, because of the encapsulation, the dissimilar metal film serves as an outer shell, minimizing thereby the decay and micronization of the compact of fine particles.

Furthermore, since the surface-treated fine particles are filled in the heat conductive porous material and formed into a compact by compression molding, the pore diameters of the porous material are consolidated thereby increasing the constraining force. Since the whole part is compressed, the filling rate of the fine particles per unit volume is also improved.

In addition, since the fine particles, the surfaces of which are coated (encapsulated) with the heat conductive dissimilar metal, are infiltrated into the spaces of the heat conductive porous material, the thermal conductivity between the porous material and the fine particles as well as between the respective fine particles is increased, and the distance between one particle and another is further shortened by the process of compression molding, thereby increasing the uniformity of thermal conductivity of the whole compact.

Corresponding to the aforementioned functions, the following technical advantages can be secured in accordance with this invention.

In the case of the fine particles without the plating treatment, even when they are formed into a compact by high compression molding, the compact of the fine particles is micronized after only several uses. When used no more than 500 times repeatedly, since the reaction rate of hydrogeration and dehydrogeneration is lowered, it is indispensable to recover the adsorption capacity by the activation treatment which is a very troublesome operation taking several hours to several days to be carried out under several tens kgs/cm$^2$ of hydrogen pressure in a pressure vessel.

In contrast with such a compact, according to this invention, the surfaces of fine particles of alloy which are elements of a compact are prevented from being contaminated by impurities as well as from the formation of an oxide film, and as a result the activation is still maintained without lowering or declining the adsorption capacity after repeated uses. Furthermore, since the decay and micronization of the alloy are successfully prevented by the encapsulation, the thermal conductivity is kept unchanged and the fine particles are sufficiently prevented from dropping out of the pores of the porous material, resulting in the maintenance of a hydrogen adsorption capacity at a high level almost indefinitely.

Besides, since the constraining force of the compact for holding the fine particles is increased by filling the particles in the porous metallic materials as well as by applying the compression molding thereto, the fine particles are successfully prevented from dropping out, and since the improvements are attained by the fine particles filling rate and the thermal conductivity, not only is an increase in the hydrogen adsorption capacity secured, but the physical strength of the whole compact is also increased, and as a result the workability required at a such step as drilling is considerably improved.

DESCRIPTION OF THE PREFERRED EMBODIMENTS

Some of the most preferred embodiments are described in detail hereunder.

With regard to the material of the hydrogen adsorption alloy, it is not necessary to specify it since any of the aforementioned materials can be used. Some of the other requirements are described in association with the "Method of Manufacturing a Hydrogen Adsorption Alloy Material" disclosed in Japanese Patent Publication No. 59-46161.

In the first place, a $MmNi_{4.5}Mn_{0.5}$ is transformed to a powdered material of fine particles of which the average grain size is approximately 15 $\mu m$ by repeating the adsorption and discharge of hydrogen. Then after being degreased and cleaned, the powdered material is coated with copper by means of wet electroless plating of autocatalitic type using a reducer. In this process, the powdered material is directly immersed into a plating solution for surface reaction thereof, but when the initiation reaction is insufficient, the powdered material is to be immersed in a known activator solution containing a palladium salt for activation treatment.

In this autocatalytic electroless plating with copper using a reducer, a folmaldehyde is used as a reducer and a plated film of about 1 $\mu m$ in thickness is formed by plating for 40 minutes at 30° C. while stirring an electroless plating solution of TMP chemical copper #500 (produced by Okuno Chemical Industries Co., Ltd.). After the surface reaction, the powdered material of fine particles is washed in water and dried at a low temperature.

Then, each of the treatments described in the following Examples 1 to 4 are respectively applied to the plated fine particles of alloy.

EXAMPLE 1

Employing a foamed aluminum (trade name: Duocel produced by Energy Research and Generation, Inc.) as a porous material, the fine particles of alloy were placed on the porous material of 20 mm in thickness, and vacant spaces of the foamed aluminum were infiltrated with the fine particles by vibrating the whole part up to the full impregnation (or saturated state). At this state the weight percentage of the filling particles of alloy to the foamed aluminum was 89%.

Then a load of 5 T/cm$^2$ was hydraulically applied to this compound while restraining the longitudinal and lateral directions thereof and the thickness was reduced to 8 mm by compression molding.

EXAMPLE 2

Employing an aluminum honeycomb core (trade name: Hivex Core produced by The Yokohama Rubber Co., Ltd.) as a porous material, the fine particles of alloy were placed on the porous material of 20 mm in thickness, and vacant spaces of the aluminum honeycomb core were infiltrated with the fine particles by vibrating the whole part up to the full impregnation. At this state, the weight percentage of the filling particles of alloy to the aluminum honeycomb core was 80%.

Then a load of 5 T/cm$^2$ was hydraulically applied to this compound while restraining the longitudinal and lateral directions thereof, and the thickness was reduced to 10 mm by compression molding.

EXAMPLE 3

Employing a foamed nickel (trade name: Celmet produced by Sumitomo Electric Industry Co., Ltd.) as a porous material, the fine particles of alloy were placed on the porous material of 10 mm in thickness, and vacant spaces of the foamed nickel were infiltrated with the fine particles by vibrating the whole part up to the full impregnation. At this state, the weight percentage of the filling particles of alloy to the foamed nickel was 60%.

Then a load of 5 T/cm$^2$ was hydraulically applied to this compound while restraining the longitudinal and lateral directions thereof, and the thickness was reduced to 10 mm by compression molding.

EXAMPLE 4

Employing a stainless three-dimensional meshed (or network) structure (trade name: P. P. Mesh Demister produced by Sankyo Tokushu Kanaami Kako Co., Ltd.) as a porous material, the fine particles of alloy were placed on the porous material of 10 mm in thickness, and the vacant spaces forming meshes were infiltrated with the fine particles by vibrating the whole up to the full impregnation. At this state, the weight percentage of the filling fine particles of alloy to the stainless three-dimensional meshed structure was 60%.

Then a load of 5 T/cm$^2$ was hydraulically applied to this compound while restraining the longitudinal and lateral directions thereof, and the thickness was reduced to 5 mm by compression molding.

Every porous material employed in the above-described Examples 1 to 4 is commonly characterized in that the vacant spaces are communicated with the surface of the compact, that the pore diameter is larger than the diameter of each fine particle, and that the preferable pore diameter is within the range of 1~3 mm, although these materials are different in the aspect of manufacturing principle and shape of the vacant spaces.

The following Table 1 shows actual values obtained as the result of the preceding Examples 1 to 4 and from comparative examples in order to confirm a numerical support, and wherein the Comparative Example 1 is a compact formed simply by infiltrating a foamed metal with fine particles of hydrogen adsorption alloy, while the Comparative Example 2 is a compact formed by compression molding.

In the above tests, each compact, i.e., test sample is respectively accepted in a pressure vessel, then the adsorption and discharge of hydrogen are repeatedly carried out at a temperature range of 35°~200° C. while applying a pressure of 30 kg/cm$^2$ to the hydrogen. The test compact was turned over by every 50 times of adsorption and discharge so as to collect the fine particles separated and dropped out of the compact. The dropping out percentage was calculated based on the initially infiltrated fine particles and the dropped ones.

Meanwhile, considering that the measurement of a thermal conductivity after the drop out of the fine particles is useless since a correlation with the hydrogen adsorption alloy is lost, with regard to the thermal conductivity, it was measured after the compact being molded at 40° C. by means of a laser beam irradiation type thermal conductivity measuring instrument.

TABLE 1

| | Example 1 | Example 2 | Example 3 | Example 4 | Comparative Example 1 | Comparative Example 2 |
|---|---|---|---|---|---|---|
| Fine Particles of Hydrogen Adsorption Alloy | Mm Ni$_{4.5}$ Mn$_{0.5}$ | Mm Ni$_{4.5}$ Mn$_{0.5}$ | Mm Ni$_{4.5}$ Mn$_{0.5}$ | Mm Ni$_{4.5}$ Mn$_{0.5}$ | Mm Ni$_{4.5}$ Mn$_{0.5}$ | Mm Ni$_{4.5}$ Mn$_{0.5}$ |
| Treatment of Fine Particles | Electroless Copper Plating | Electroless Copper Plating | Electroless Copper Plating | Electroless Copper Plating | — | — |
| Base Material of Compact | Foamed Aluminum | Aluminum Honeycomb Core | Foamed Nickel | Stainless Three-dimensional Mesh Structure | Foamed Aluminum | — |
| Filling Rate (%) | 80 | 80 | 60 | 60 | 80 | 100 |
| Molding Method | 5 T/cm$^2$ of Hydraulic Pressure | 5 T/cm$^2$ of Hydraulic Pressure | 5 T/cm$^2$ of Hydraulic Pressure | 5 T/cm$^2$ of Hydraulic Pressure | — | 15 T/cm$^2$ of Hydraulic Pressure |
| Compression Ratio (%) | 40 | 50 | 40 | 50 | — | — |
| Dropping out Ratio (%) after | 0 | 0 | 0 | 0 | 80 Most Part | 100 Compact Decayed |

TABLE 1-continued

|  | Example 1 | Example 2 | Example 3 | Example 4 | Comparative Example 1 | Comparative Example 2 |
|---|---|---|---|---|---|---|
| 100 times of repeated uses Thermal Conductivity W/KM | 20 | 19 | 17 | 16 | Micronized and Dropped 16 | and Micronized 2 |

While the above-described embodiments represent the preferred forms of this invention, it is to be understood that modifications will occur to those skilled in this art without departing from the spirit of this invention. The scope of this invention is therefore to be determined solely by the appended claims.

What is claimed is:

1. A compact of hydrogen adsorption alloy, comprising:
   a porous metal foam member; and
   fine particles infiltrated into the pores of the porous metal foam member, wherein:
   the fine particles are selected from the group consisting of lanthanum-nickel, misch metal-nickel-aluminum, iron-titanium, titanium-manganese, calcium nickel, magnesium-copper or magnesium-nickel, said fine particles having an average grain size of not more than 15 μm, all surfaces of said fine particles being completely coated before infiltration into the pores of the porous metal foam member with copper by autocatalytic type wet electroless plating using a reducer while maintaining porosity permitting permeation of hydrogen gas; and
   the porous metal foam member and the infiltrated coated fine particles are compacted by compression molding.

2. A compact hydrogen adsorption alloy, comprising:
   a porous metal foam member; and
   fine particles infiltrated into pores of the porous metal foam member, wherein:
   the fine particles are selected from the group consisting of lanthanum-nickel, misch metal-nickel-aluminum, iron-titanium, titanium-manganese, calcium nickel, magnesium-copper or magnesium-nickel, said fine particles having an average grain size of not more than 15 μm, all surfaces of said fine particles being coated before infiltrating the pores of the porous metal foam member with nickel by autocatalytic type wet electroless plating using a reducer while maintaining porosity permitting permeation of hydrogen gas; and
   the porous metal foam member and the infiltrated coated fine particles are compacted by compression molding.

* * * * *